United States Patent [19]

Lougheed et al.

[11] 4,249,630
[45] Feb. 10, 1981

[54] PLOW GUIDANCE SYSTEM

[75] Inventors: James H. Lougheed, Kanata; Lorne C. Hinz, Richmond, both of Canada

[73] Assignee: Northern Telecom Limited, Montreal, Canada

[21] Appl. No.: 956,099

[22] Filed: Oct. 31, 1978

[51] Int. Cl.³ .............................................. B62D 1/28
[52] U.S. Cl. ................................... 180/168; 324/236; 405/175
[58] Field of Search ...................... 180/142, 167, 168; 405/154, 174, 175, 180, 183; 324/207, 208, 234, 236; 172/6

[56] References Cited

U.S. PATENT DOCUMENTS

| | | | |
|---|---|---|---|
| 3,198,279 | 8/1965 | Quinn | 180/168 |
| 3,468,391 | 9/1969 | Rushing et al. | 180/168 |
| 3,473,110 | 10/1969 | Hardin et al. | 324/236 |
| 3,521,184 | 7/1970 | Bowker | 324/236 X |
| 3,723,862 | 3/1973 | Wentzel et al. | 324/236 |
| 3,889,478 | 6/1975 | Marshall | 405/175 |
| 4,006,790 | 2/1977 | Kawano et al. | 180/168 |

Primary Examiner—Richard A. Bertsch
Assistant Examiner—Michael Mar
Attorney, Agent, or Firm—Stuart L. Wilkinson

[57] ABSTRACT

A guidance system suitable for use in burying cable uses a previously buried signal-emitting cable to produce a signal along the cable path. A vehicle mounted plow used to plow a second path has a receiver which analyzes signal from the buried cable and determines from it both the lateral direction and the extent of vehicle movement in order to maintain a predetermined lateral spacing of the two paths.

8 Claims, 4 Drawing Figures

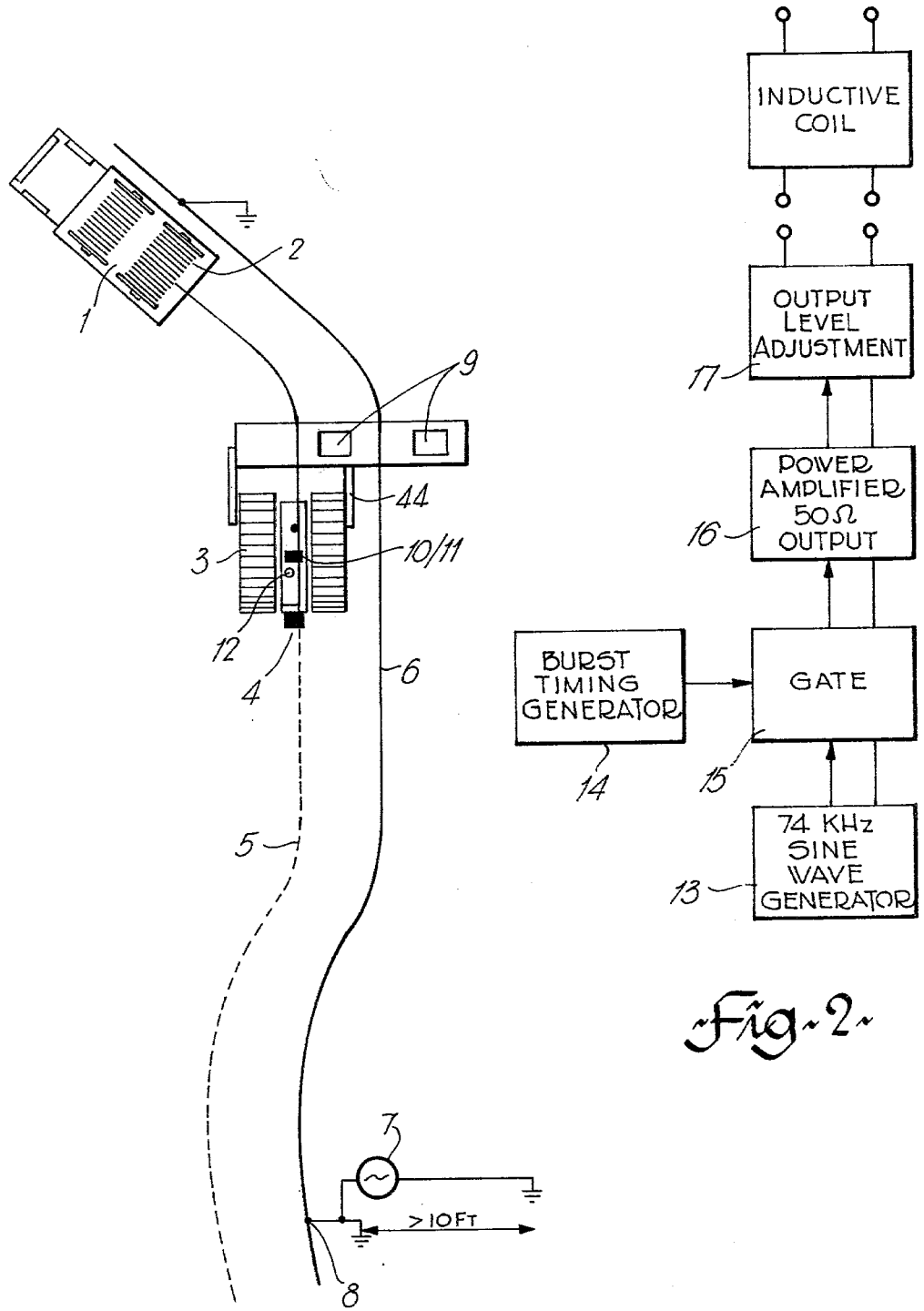

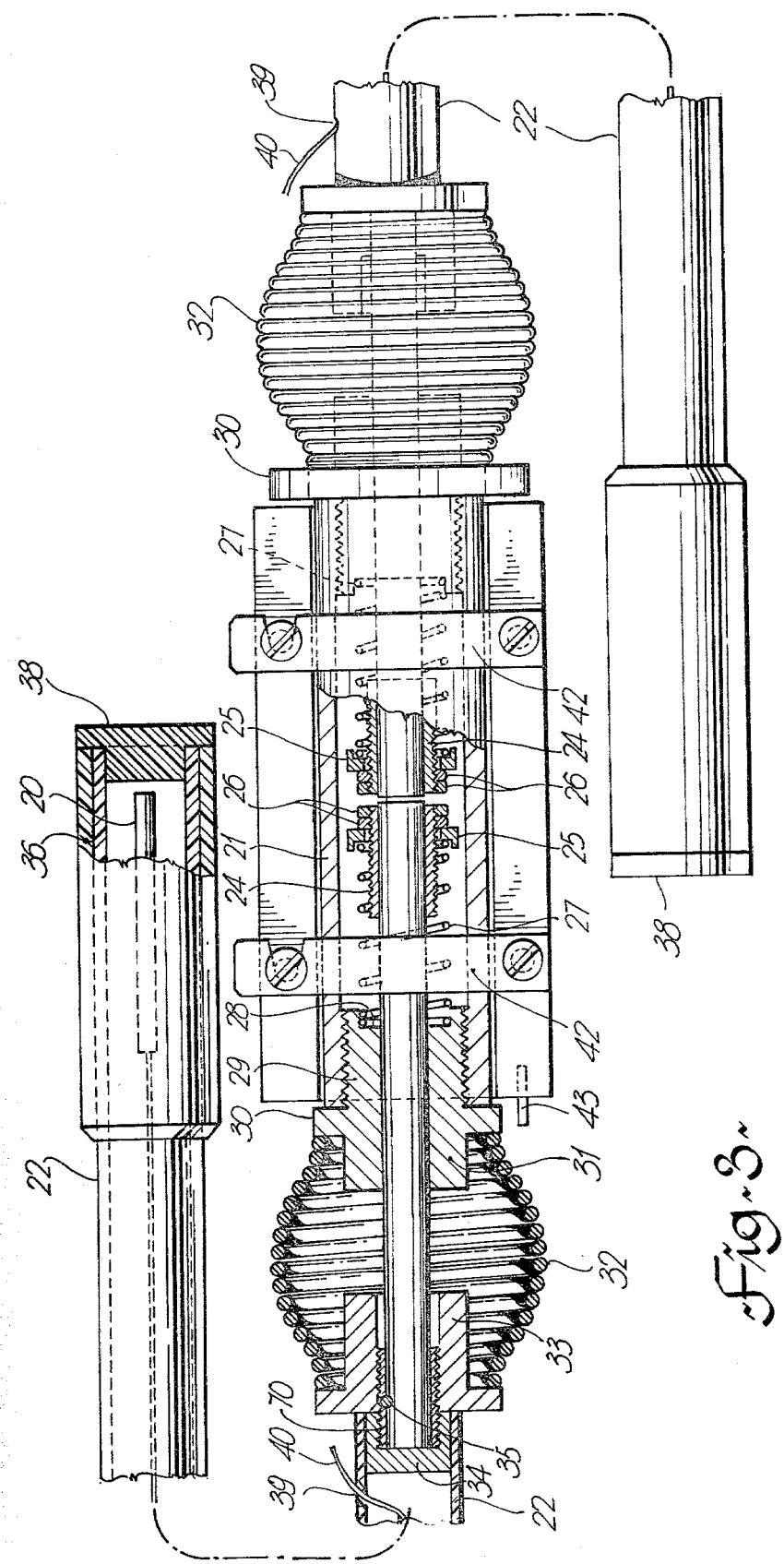

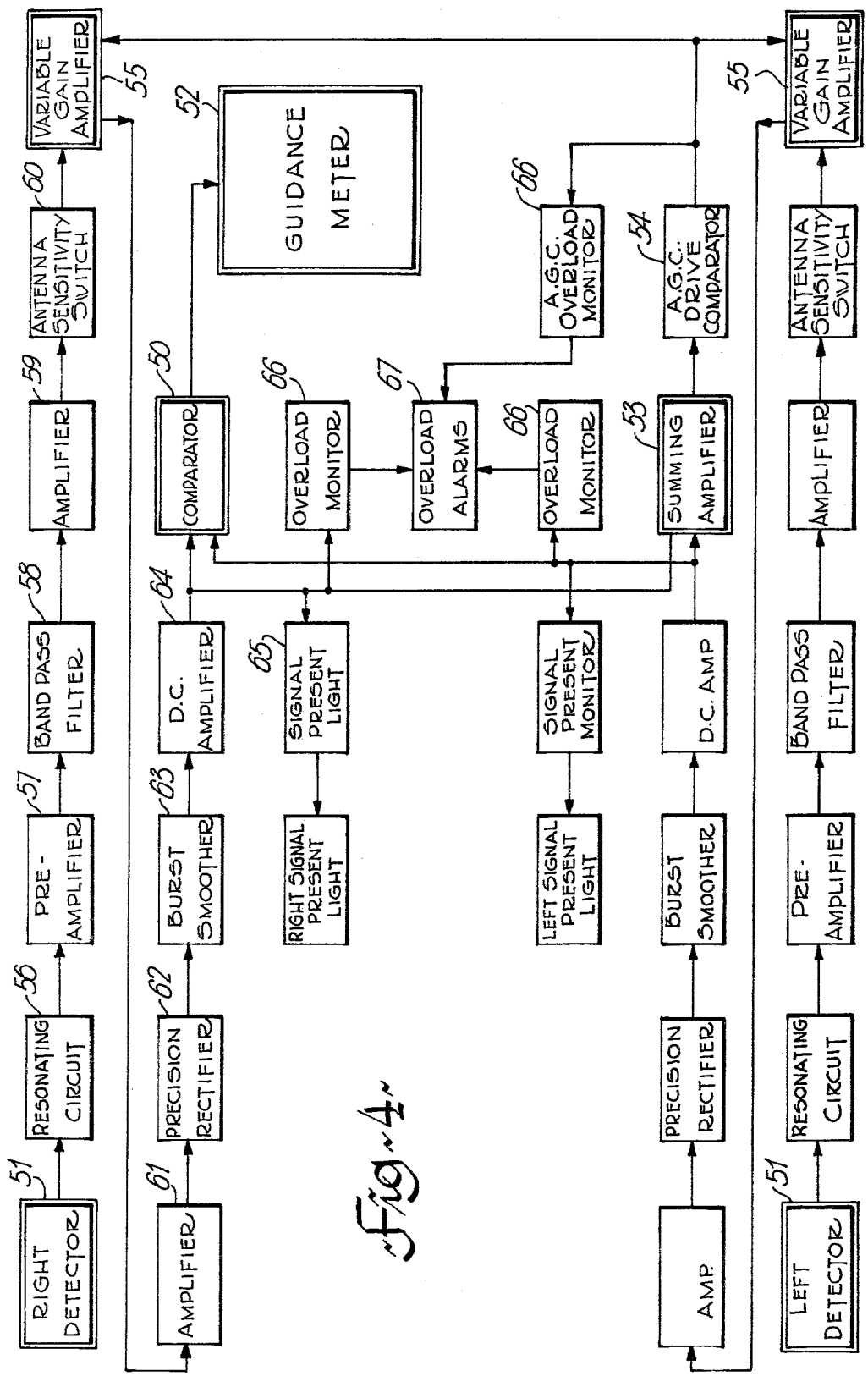

PLOW GUIDANCE SYSTEM

This invention relates to plow guidance systems especially to such systems adapted for use in buying cable.

In the past few years more and more of the telephone system cable has been buried. Many of the earlier placed cables have now reached their capacity and new cables are required to handle the increasing load. Some of these cables must be plowed in the limited width of the previous right of way and this crowding presents the possibility of cutting the existing cable while plowing in the new one. Presently the existing cable is located and staked to mark its path and test holes are dug to verify the accuracy of some of the stakes. The new cable is then plowed a set distance from the stakes in the hope of not hitting the existing cable. However, the stakes are only placed at intervals along the cable path and there exists the possibility that the old cable does not follow a straight line path between adjacent stakes but is actually in the path where the new cable is intended to be plowed.

An instrument which would continuously map out a previously buried cable ahead of the cable plow would eliminate the costly process of staking out existing cable locations and help the plow operator to avoid damaging buried cable.

In its broadest aspect the present invention envisages a guidance system using a ground-based, signal-emitting conductor to produce a signal along the path of the conductor, the system including a vehicle mounted plow for plowing a second path and a vehicle mounted receiver for receiving signal emitted by said conductor, said receiver including signal analyzing means adapted to analyze said signal and to determine therefrom a lateral direction of movement required of the vehicle in order to maintain a predetermined lateral spacing of said paths.

To this end, the system can include a pair of laterally spaced detectors, preferably mounted on an elongate boom the boom itself mounted on the vehicle in a plane substantially parallel to a ground contacting plane of the vehicle and in a direction substantially perpendicular to a drive direction of the vehicle. The signal analyzing means can include corresponding comparator means for comparing with signals received at said two detectors, the comparator means operating an output indicative of said lateral direction which can be displayed to a vehicle operator in order that he might take corrective action.

The signal analyzing means is preferably further adapted to determine from said received signal a lateral extent of movement required of the vehicle in order to maintain said predetermined lateral spacing of said paths. To this end the analyzing means preferably includes amplifier means for amplifying signals from said detectors, summing means for summing said signals, comparator means for comparing said summed signals to a fixed reference, and feedback means for controlling said amplifying means to maintain the magnitude of the summed signals substantially constant while maintaining gain of the individual signals substantially identical.

An embodiment of the invention will now be described by way of example with reference to the accompanying drawings, in which:

FIG. 1 is a plan view of a tracked vehicle utilizing the guidance system of the invention to plow in a new cable alongside a buried cable;

FIG. 2 is a block schematic diagram of an energizer for applying alternating current to the buried cable to produce a magnetic field around the cable;

FIG. 3 is a part-sectional view of a support structure for magnetic field detectors, the support structure adapted for mounting on the tracked vehicle; and FIG. 4 is a block schematic diagram of a receiver.

FIG. 1 shows a truck 1 carring a reel of cable 2. The cable is payed out in front of a tracked vehicle 3 towing a plow 4. The plow is of a known type, shaped and operable to cut a trench, to guide the payed out cable into it and to backfill in a combined operation. The new cable is laid along a path 5 running parallel to a path 6 of a previously buried cable when, for example, the old cable has reached its full capacity and cable easement is limited in width. Damage to the old cable is prevented by using a plow guidance system to keep the two paths a fixed distance apart.

The plow guidance system in its simplest aspect utilizes an energizer 7 to couple bursts of tone into a conducting sheath 8 of the old cable so that for a certain distance at least along the cable a corresponding magnetic field exists around the cable. A pair of identical magnetic field detectors 9 mounted on the tracked vehicle 3 experience equal magnetic field components when located equidistantly from and on opposite sides of the path 6.

The detectors 9 are mounted forwardly and to one side of the vehicle, the plow 4 being mounted rearwardly and centrally of it. As long as the receiver 10, under the control of the detectors 9, registers a null signifying equal field strengths, then the paths 5 and 6 will be a distance apart equal to the lateral spacing between a plow and a point intermediate the detectors 9. If the spacing alters, the receiver guidance meter 11 provides an indication to the tracked vehicle operator 12 of the direction and extent of lateral vehicle movement needed for the null reading, and consequently the desired spacing between the paths 5 and 6, to be restored. The danger of cutting the old cable can thus be minimized and easement space efficiently utilized.

A circuit block diagram of the energizer is shown in FIG. 2. An oscillator 13 emits a 74 kHz sine wave which is gated by a timing generator 14 and a gate 15 to produce a bursted wave of 12 milliseconds duration and a 60 millisecond repetition interval. The oscillator output is bursted to conserve battery power. A frequency of 74 kHz is adopted since it represents an optimization of a low frequency required for an associated magnetic field to penetrate from the emitting conductor through the ground and a high frequency required for the magnetic detectors to detect the presence of a magnetic field, since detector signal is proportional to the rate of change of magnetic field.

The bursted sine wave is gated to a power amplifier 16 and an output level adjustment stage 17. To further conserve battery power, d.c. bias to the power amplifier 16 is arranged to switch off between bursts of tone. The output impedance of the amplifier 16 and the values of selectable resistances in the output level adjustment stage 17 are chosen to adapt the output level to both the particular grounding configuration existing in the neighbourhood of the buried cable and to the various methods of applying tone to the buried cable.

Tone is applied to the conducting cable sheath 8, which typically is of aluminum composition and provides moisture and electrical protection. One of three methods is used depending on the accessibility of the old cable.

In a first such method, one terminal of the oscillator is connected directly to a cable sheath ground bond at an adjacent pedestal, i.e. a housing for connections between conductor pairs at which a ground connection is easily accessible. The other terminal is grounded by a stake driven into the earth a few feet from the pedestal. Some of the oscillator output flows to the pedestal through the earth to the grounded stake and then back to the oscillator. The remaining tone flows down the cable sheath to the successive ground points, a fraction of the signal returning to the oscillator through the earth from each ground point along the route.

In a second way of applying the tone, a coupler having a circular iron core is clamped to the cable so that the core surrounds the cable. Tone is applied by transformer action, this method being used when no metallic connection to the cable sheath is possible.

Finally if the previously laid cable system is totally buried so preventing direct access to the cable, tone is applied by initially applying alternating current to an inductive coil located above the cable so that the coil induces a signal in the cable sheath. It has been found advantageous to fabricate the coil as a printed circuit board (not shown) bearing a spiral conducting path, this being preferred to a conventionally wound induction coil because of eace of manufacture. However, this last method is not recommended in an environment in which several conductive utilities are in close proximity since the wrong one may be energized.

The receiver consists of two parts, the detectors shown in FIG. 3 and the receiver electronics shown in block schematic form in FIG. 4.

As shown in part section in FIG. 3, two detectors 20 which are ferrite rods wound with turns of copper wire, are housed within an elongate boom. The boom consists essentially of a central rigid metal tube 21 and a pair of outer plastic tubes 22 which house the ferrite rods. Linking each of the tubes to the central tube is a spring arrangement. The central feature of each spring arrangement is a cable 23 which functionally holds the plastic tubes 22 against the central rigid tube 21. Each end of the cable is soldered into outwardly threaded annular sectioned studs 24 and 70. The stud 24 is lcoated within the tube 21 and has a cup washer 25 mounted at one end, the cup washer being maintained in place by lock nuts 26 on one side and by a compression spring 27 on the other side. The cable 23 passes through the spring 27. The other end of the spring 27 seats in a recess 28 in an externally threaded hollow bushing 29 which screw engages within the end of tube 21. The bushing has a central flange 30 and tubular part 31 extending on the side of the flange remote from the tube 21. Against the flange 30 seats one end of an extension spring 32 having a spring constant somewhat higher than that of the spring 27. The other end of spring 32 seats against a corresponding formation in a further bushing 33 which screw engages the other stud 70.

Over part of the stud projecting beyond the bushing 33 is anchored one end of the tube 22. A sleeve 34 adapts the tube diameter to that of the stud 70 the assembly being held together by adhesive and an offset dowel pin 35.

The tube 22 has a strengthening sleeve 36 in the region of the ferrite cores, a cap 38 sealing the outer end of the tube 20 on sleeve 36. The ferrite rods are surronded by grease or other such medium which prevents ingress of moisture and, to some extent, protects the brittle ferrite rods 20 against shock. The tube 22 is apertured at 39 to permit location of a monitoring wire from the detector 20 to the receiver.

During assembly, the extension spring 32 has a compressional pre-load applied to it by the compression spring 27. The pre-loading prevents the tubes 22 from oscillating relative to the centre tube 21 when the centre tube vibrates but permits the tubes to be deflected out of the longitudinal axis of the central tube 21 if a moment greater than the threshold moment is applied about the spring arrangement. The spring 32 is of a type known in the art which initially resists any bending moment until a threshold force is exceeded, increase in resistance to further bending then being minimal.

The central tube 21 of the boom is detachably mounted within a padded trough in a bracket 41. The bracket has two latches 42 for locking the boom in place, and an indexing pin 43 so located that only the smaller one of the two flanges 30 can be sited next to the bracket. In this way, the orientation of the boom is defined so as to prevent reverse readings, the result of which could be catastrophic.

The bracket 41 is mounted or welded to each of a pair of reciprocal arms 44 (FIG. 1) at the front of the tracked vehicle 3 so that the boom can be offset to the left or the right of the centrally mounted plow 4 depending on the selected new cable route.

Turning now to FIG. 4 which shows a circuit block diagram of the receiver, the major stage of the receiver is a comparator 50 for comparing the signals from the identical left and right detectors 51 to produce a corresponding deflection at a guidance meter 52. A pointer of the guidance meter indicates the lateral direction in which the operator must turn his vehicle in order to resite the boom centre point perpendicularly above the existing energized cable.

The other major feature of the receiver is an automatic gain control capability. The purpose of the automatic gain control is to relate the angle of deflection of the guidance meter directly to the lateral displacement of the boom centre from the path of the previously buried cable so that the guidance meter pointer indicates not only direction, but also the extent of vehicle movement required in order to resite the boom centre perpendicularly above the existing energized cable. Automatic gain control eliminates dependence of deflection on signal level variations due to particular cable sheath grounding configurations, to ground resistance energizer output signal level, and, to some extent, depth. The automatic gain capability takes the form of a summing amplifier 53 which sums signals from the two detectors 51, the summed signal being compared to a fixed reference level at an automatic gain control comparator 54. The output of comparator 54 controls amplifiers 55 to stabilize the aggregate signal level from the detectors 51 while keeping gain introduced in the two signals equal.

Other features of the receiver are relatively standard. Circuit stages from each of the detectors 51 up to the comparator 50 and summer 53 are duplicated. First, the output from each detector 51 is taken to an RC resonator circuit 56 arranged to exclude stray signals at, for example, mains frequency or frequencies other than 74 kHz which might give spurious readings and overload or generate harmonics at a following pre-amplifier 57. The pre-amplifier output is filtered by a filter 58 having a passband of 74 kHz and then via amplifier 59 is taken to a detector sensitivity switch 60 which is manually set to one of several possible levels depending on the particular signal level received from the buried cable. The switch is taken to the automatic gain control amplifier 56, bias to which is provided from automatic gain control drive comparator 54. Following amplification at amplifier 61, the signal is rectified 62, and smoothed 63 and the resulting d.c. signal amplified 64 before being fed to the comparator 50 and summer 51 discussed previously.

To particularly adapt the circuit for practical use, monitors 65 are incorporated to provide to the operator a visual indication when signal is received from a detector 51. Without this a deflection could be shown through one of the detector legs failing and the apparent correction might result in the operator driving the plow 4 across the buried cable 6. Also incorporated are overload monitors 66 for monitoring the signal levels from the automatic gain control drive comparator 54, and from the two d.c. amplifiers 64, the monitor outputs being fed to an audible alarm 67 so that the operator can take corrective action if circuit components are overloaded. Corrective action includes alterating the detector sensitivity switch or alterating the output level of the energizer.

The system of the invention can be used in an alternative way to that described with reference to FIG. 1. A desired cable path to be plowed is marked out in the region of a buried conductor with the path unrelated to the path of the buried conductor. The operator then positions the boom on the same side of the tracked vehicle that the buried cable is known to be. The operator follows the plowing path and, so long as the deflection pointer on the guidance meter indicates that the vehicle should be turned towards the buried cable, he ignores it. However, as soon as the deflection pointer reverse through the null point then the operator deviates from the desired path by an amount sufficient to restore the null point and continues plowing with that reading until the guidance meter arrow indicates that the vehicle should be turned towards the buried cable at which time the operator puts the vehicle back on its original staked out track.

The application of the invention has been described in terms of burying cable in the earth. In another application of the invention a conducting cable is laid alongside a routeway, for example an airport runway, so that when the runway is covered in snow, a snow plow, on which is mounted a receiver as previously described, can be used to remove the snow without, for example, straying across arrays of landing lights. Indeed power cables to such lights can be used as the guiding conductor.

What is claimed is:

1. A guidance system comprising:
    a transmitter for coupling an ac signal to a buried conductor extending along a first path to establish a magnetic field around the conductor, the transmitter incorporating an essentially spiral conducting strip formed on a circuit board to function as an inductive field antenna;
    vehicle mounted plow means for plowing along a second path; for laying a cable and
    a vehicle mounted receiver for receiving a signal emitted by the conductor, the receiver including signal analyzing means adapted to analyze the emitted signal and to determine therefrom a lateral direction and extent of movement required of the vehicle in order to maintain a predetermined lateral spacing of the paths and display means under the control of said signal analyzing means to display said lateral direction and extent of movement.

2. A guidance system as claimed in claim 1 said receiver including a pair of laterally spaced magnetic induction field detectors and the signal analyzing means includes comparator means for comparing signals received at said two detectors.

3. A guidance system as claimed in claim 2, said signal analyzing means further including amplifier means for amplifying signals from said detectors, summing means for summing said signals, comparator means for comparing said summed signals to a fixed reference, and feedback means for controlling said amplifier means to maintain the magnitude of the summed signals substantially constant while maintaining gain of the individual signals substantially identical.

4. A guidance system as claimed in claim 3, the signal analyzing means associated with each detector further comprising an RC resonating circuit, a bandpass filter having a passband containing the frequency of said emitted signal, a sensitivity switch, and recitifying and smoothing means for producing a dc signal.

5. A guidance system as claimed in claim 2, in which said detectors are disposed at opposite ends of an elongate boom, said boom adapted to be mounted on a vehicle in a plane substantially parallel to a ground contacting plane of the vehicle and in a direction substantially perpendicular to a drive direction of the vehicle.

6. A guidance system as claimed in claim 5, the boom being articulate and having a central mounting member, a pair of outer members supporting respective detectors, and spring means adjacent the central member and each outer member to permit the outer members to be resiliently deflected relative to the central member.

7. A guidance system as claimed in claim 6, in which each of said spring means comprises a pair of springs, a first spring extended and acting against a second spring to keep the second spring normally compressed but subject to extension by a threshold force in a direction tending to deflect the outer member relative to the centre member, extension of said second spring on deflection producing minimal variation in restoring force of said second spring.

8. A guidance system as claimed in any of the preceding claims, the transmitter further comprising an oscillator, gating means for gating a sine-wave burst from the oscillator, amplifier means and output level adjustment means.

* * * * *